F. M. ILER.
TUNNELING AND SHAFT BORING MACHINE.
APPLICATION FILED MAY 11, 1908.
986,293.
Patented Mar. 7, 1911.
3 SHEETS—SHEET 3.
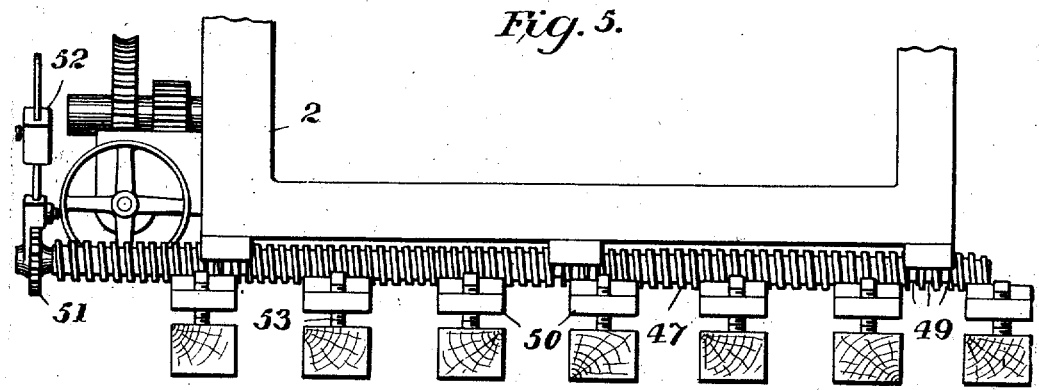
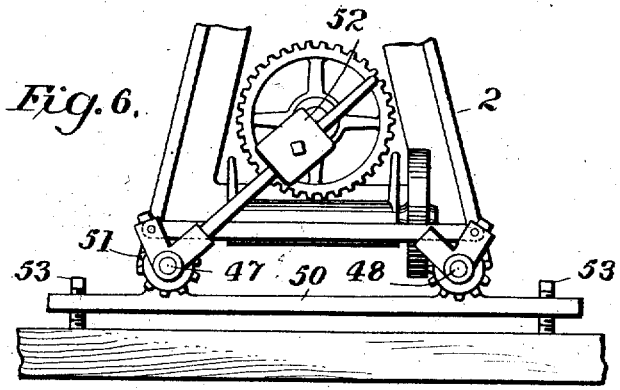
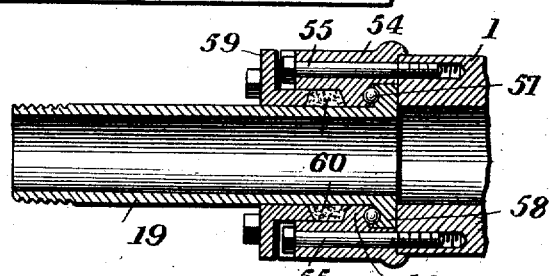
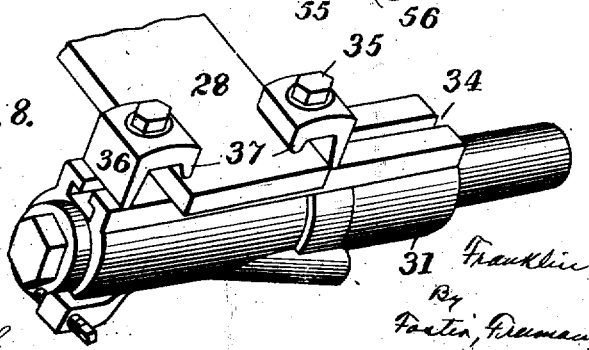
Witnesses
Inventor
Franklin M. Iler
By Foster, Freeman, Watson & Coit
Attorneys

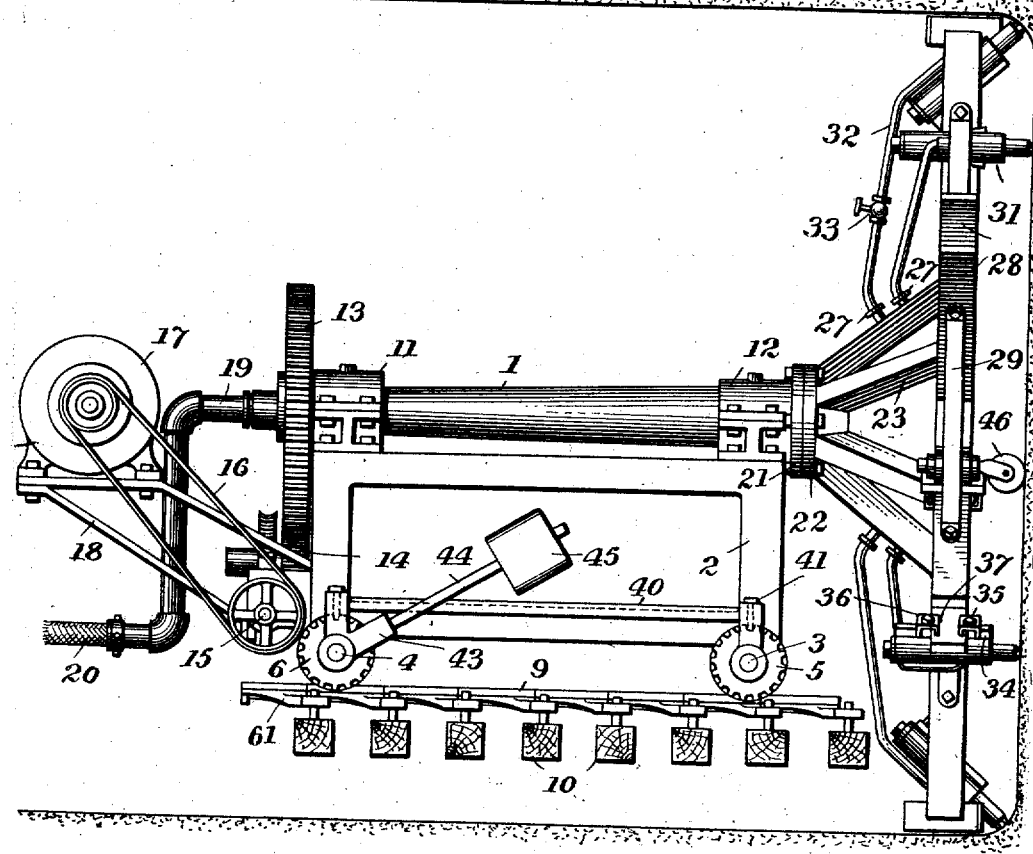

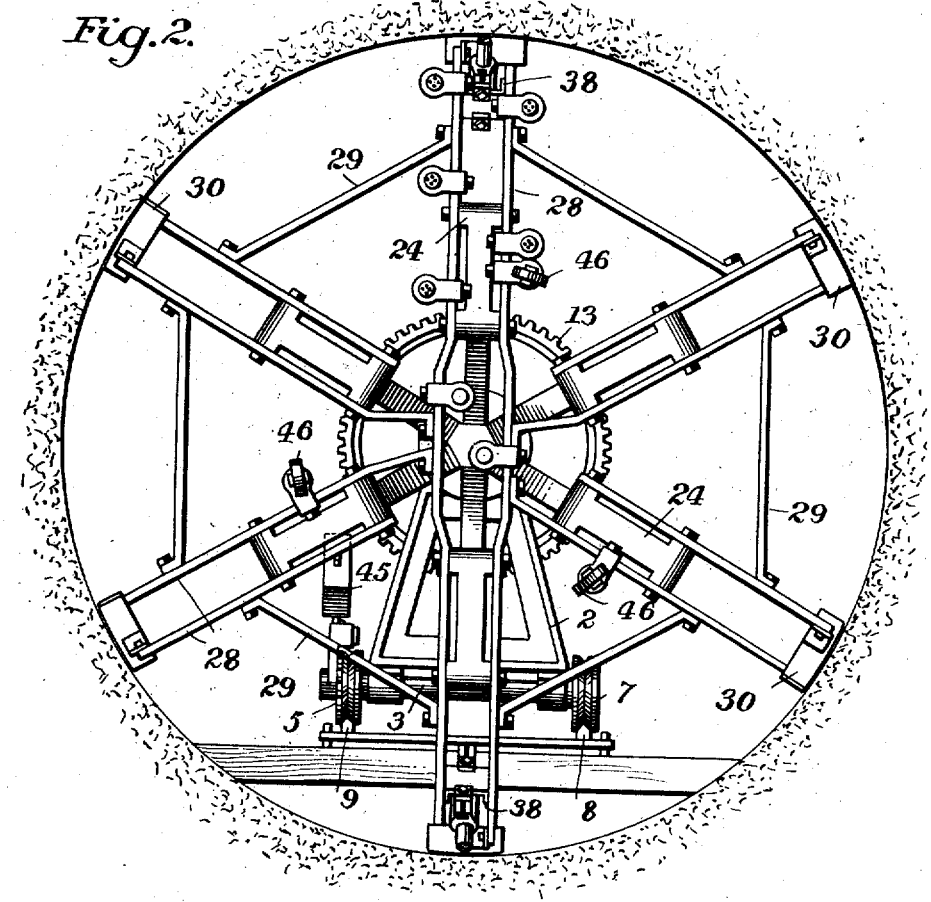
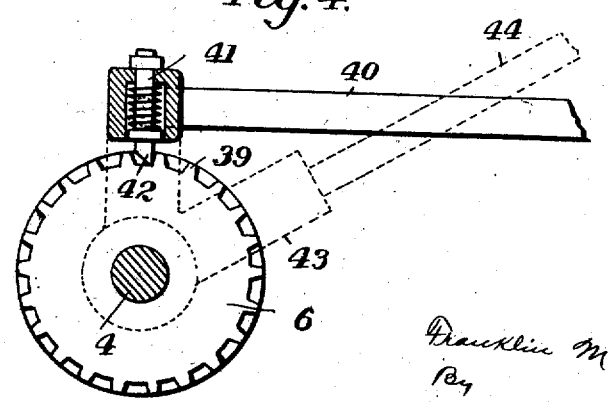

UNITED STATES PATENT OFFICE.

FRANKLIN M. ILER, OF DENVER, COLORADO.

TUNNELING AND SHAFT-BORING MACHINE.

986,293.                    Specification of Letters Patent.    Patented Mar. 7, 1911.

Application filed May 11, 1908. Serial No. 432,087.

*To all whom it may concern:*

Be it known that I, FRANKLIN M. ILER, a citizen of the United States, residing at Denver, in the county of Denver and State of Colorado, have invented certain new and useful Improvements in Tunneling and Shaft-Boring Machines, of which the following is a specification.

This invention relates to machines intended to cut a shaft or tunnel directly through rock, and its objects are to improve the structure of the machine as a whole, the means for mounting drills, and the means for feeding and operating the machine whereby it will easily and efficiently cut a clean shaft straight through solid material such as rock.

The invention contemplates the use of pneumatically operated drills and includes means by which they may be easily and quickly adjusted to proper position, and may be made to cover the entire surface which it is desired to cut away.

The novel features are fully set forth in the following description and drawings.

Figure 1 is a side elevation of the preferred form of my machine; Fig. 2 is an end view of the machine shown in Fig. 1; Fig. 3 is a longitudinal section of the main shaft and hollow skeleton spider head; Fig. 4 is an enlarged detail view of a portion of ratchet feeding mechanism; Fig. 5 is a side elevation partly broken away showing a modified form of mechanism for feeding the machine forward; Fig. 6 is an end view of the structure shown in Fig. 5; Fig. 7 is an enlarged longitudinal section of the joint between the main shaft of the machine and the supply pipe; and Fig. 8 is an enlarged detail perspective view of the adjustable means for securing the drills in place.

As shown in Figs. 1 and 2 of the drawings, my apparatus includes a main rotatable hollow shaft 1 which is mounted on a frame 2 which is supported by shafts 3 and 4 mounted upon the wheels 5, 6 and 7. These wheels have V-shaped grooves which fit the V-shaped metal tracks 8, 9 which are supported by the cross ties 10 which are preferably made of wood.

The frame 2 has upon its top the journal bearings 11, 12 within which shaft 1 is mounted and rotates. Secured to the shaft 1 back of the journal bearing 11 is the large gear wheel 13 which meshes at its lower part with a small pinion 14 operated by a worm gear on the shaft 15, which shaft 15 is driven by a belt 16 from any suitable motor 17. I have shown diagrammatically the motor 17 as an electric motor, and as mounted upon a table or framework 18 carried by the frame 2. A pipe 19 is secured to the end of the shaft 1 by means of a ball bearing stuffing joint which permits the relative rotation of the parts, and to this pipe 19 I secure the flexible hose 20 which supplies the fluid, preferably air, for operating the drills hereafter described.

Upon the forward end of the shaft 1 I have shown a flange 21, and to this flange is secured the hollow skeleton spider head 22 which is preferably formed in one piece and includes the radiating arms 23 placed at an angle to the shaft 1. I preferably make the outer ends of the arms 23 as shown in Fig. 3 at right angles to the shaft 1, and with the enlargements or bosses 24 having openings 25 therethrough for the passage of bolts. The arms 23 also have openings 26 which may be made in any desired number to receive the end 27 of the pipes which supply air pressure to the drills.

I secure to the outer ends of the arms 23 cross arms 28 which are bolted to the enlargements 24. These cross arms are preferably made of flat wrought metal bars, and I preferably place one upon each side of each arm 23, thereby producing symmetrical radiating arms at right angles to the shaft 1. One pair of these arms extends entirely across the machine, and one arm of each of the other pairs is preferably secured to these arms as shown. I may also use the cross braces 29 connecting adjacent arms for the purpose of strengthening the machine. On the outer ends of the arms 28 I place the scrapers 30 which may be made in the shape of blades, plows or cups designed to carry away the cuttings which fall to the bottom of the shaft from the various cutting tools. It is to be understood that these scrapers carry the cuttings up and deliver them into a conveyer not shown, for carrying them out of the shaft. While I prefer to use the wrought metal arms 28 as illustrated, it is to be understood that these arms constitute a continuation of the arms 23, and that my invention is not limited to this particular construction.

The pneumatic tools 31 are provided with adjustable clamps for securing them to the arms 28 in any desired position and they are connected to the openings 26 in the arms 23 by tubes 32 which may be made flexible, and which may be provided with valves 33. As a convenient means for clamping the drills in place I have shown the drill casing provided with a longitudinal T-shaped slot 34 adapted to receive the heads of the bolts 35 which pass through the loose clamping members 36 having downturned engaging points 37. I have found that it is desirable to have the drills at the outer margin of the machine placed at an angle so as to cut a rounded instead of a sharp corner, and in order to conveniently mount the drills in this position I have shown cross pieces 38 connecting adjacent arms 28 upon which the drills may be clamped at the desired angle. By the arrangement of arms above indicated it is apparent that the pneumatically operated drills may be placed at various points from the center to the outer margin of the machine so that upon the revolution of the operating parts some drill will strike every point of the surface at the end of the shaft, and thus the shaft will be bored uniformly and evenly.

In order to feed the machine forward and to keep it in proper position with relation to the end of the shaft, I employ a pawl and ratchet mechanism operated by a weighted arm, as shown clearly in Figs. 1, 5 and 6. In one form of this mechanism I provide teeth 39 on the margin of the wheels 2 on one side of the frame and place the longitudinal arm 40 carrying the pawls 41 above these wheels so that the lower inclined points 42 of the pawls will engage the teeth on the wheel. One end of the arm 40 is pivotally secured to the angle piece 43 mounted to turn on the shaft 4 and having rigidly secured thereto the arm 44 which carries the adjustable weight 45. It will be understood that the elevation of the arm 44 will carry the inclined point 42 over one of the teeth in the wheel and that a subsequent depression of the arm will propel the machine forward. It will also be understood that the arm 40 connecting the two pawls on the two wheels will make those pawls operate simultaneously upon the two wheels. The weight 45 in the position shown in Fig. 1 therefore tends to force the machine forward, and this tendency may be regulated by adjusting the weight to various positions on the arm. In order to prevent the weight, which normally tends to force the machine forward, from bringing it into close contact with the end of the shaft so as to interfere with the operation of the drills, I provide rollers or casters 46 which engage the end of the shaft and hold the pneumatic tools at just the right position for effective operation. This position will be such that the exhaust port of the pneumatic tool is open when the end of the tool strikes the wall at the end of the shaft.

In order to reverse the machine and draw it away from the end of the shaft it is only necessary to reverse the pins, which act as pawls so that the inclined lower point will face in the opposite direction from that shown and to then crank the arm. For this purpose the weight may be removed.

I prefer to make the track on which the machine runs in this form of the machine, of short metal pieces 61 shaped as indicated in Fig. 1, so that they may be easily and quickly put in place and secured together resting upon the cross ties beneath, since in the use of the machine it is customary to remove sections of the track behind the machine as it advances and to place those sections in front of the machine.

My preferred feeding mechanism is however shown in Figs. 5 and 6, wherein the frame 2 is mounted on two longitudinal screws 47, 48 instead of on rollers. The screws are secured to the frame by means of straps or yokes 49 fitting in circumferential grooves in the screws so as to maintain the screws in a fixed relation to the frame. The screws rest in semi-circular sockets in the plates 50 mounted on the cross ties, and these sockets are provided with screw threads corresponding with those on the screws. By reason of the fact that the straps or yokes are in the grooves beneath the bottom of the screw threads they will not interfere with the passage of the screws across the plates 50. It will be understood that the rotation of the screws will by reason of their engagement with the fixed plates 50 make the screws travel longitudinally carrying the frame with them. The screws are turned by pawl and ratchet mechanism similar to that described in connection with the wheel supported frame. The pawls engage toothed wheels 51 on the rear ends of the screws, and as shown, the weight 52 tends normally to force the machine forward. The pawls may be reversed in order to withdraw the machine as above described. In this form of the machine the plates 50 having the semi-circular sockets may be regarded as the track on which the machine travels. These plates are vertically adjustable by means of the screw threaded supports 53 at their ends.

The ball bearing stuffing joint between shaft 1 and supply pipe 19 is clearly shown in Fig. 8. It includes the detachable ring 54 secured to the end of shaft 1 by bolts 55 and having the interior circumferential flange 56 furnishing a bearing for the balls 57. A flange 58 on pipe 19 furnishes the other bearing. A detachable ring 59 fits between ring 54 and pipe 19 and holds in place the packing 60.

It will be understood that modifications may be made in the details shown without departing from my invention, and that I do not wish to limit myself to the exact form shown.

Having thus described my invention, what I claim is,—

1. In a rock drilling machine, the combination with a suitable frame, of a hollow rotatable shaft carried by said frame, divergent rigid hollow arms constituting a continuation of said hollow shaft and projecting therefrom at an angle, means for supporting fluid operated drills by said arms in various adjusted positions at different points, and means for connecting the inlet ports of said drills with the interior of said arms.

2. In a rock drilling machine, the combination with a suitable frame, of a hollow rotatable shaft carried by said frame, divergent rigid hollow arms constituting a continuation of said hollow shaft and projecting therefrom at an angle, means for supporting fluid operated drills by said arms at any adjusted position from the center to the outer margin of the machine, and means for connecting the inlet ports of said drills with the interior of said arms.

3. In a rock drilling machine, the combination with a suitable frame, of a hollow rotatable shaft carried by said frame, a skeleton spider head rigid with said shaft having hollow arms constituting a continuation thereof, means for securing fluid operated drills to said arms at different points laterally of said hollow shaft, and means for connecting the inlet ports of said drills with the interior of said arms.

4. In a rock drilling machine, a hollow rotatable shaft having a cast metal skeleton spider head including hollow outwardly and forwardly extending arms, the ends of which extend at substantially right angles to the hollow shaft, cross arms, and means for securing said cross arms to said ends.

5. In a rock drilling machine, a hollow rotatable shaft having a cast metal skeleton spider head including hollow outwardly and forwardly extending arms, the ends of which extend at substantially right angles to the hollow shaft and cross arms carrying drills secured to said ends.

6. In a rock drilling machine, the combination with a hollow rotatable shaft, of a skeleton spider head for said shaft having spider arms, and cross arms secured to said spider arms at substantially right angles to the shaft.

7. In a rock drilling machine, the combination with a hollow rotatable shaft, of a cast metal skeleton spider head secured to said shaft having spider arms, and wrought metal cross arms bolted to said spider arms.

8. In a rock drilling machine, the combination with a hollow rotatable shaft, of a skeleton spider head for said shaft having spider arms, and flat cross arms bolted to the outer ends of the spider arms.

9. In a rock drilling machine, the combination with a hollow rotatable shaft, of a skeleton spider head for said shaft having spider arms, and flat cross arms bolted to the outer ends of the spider arms on each side of said arms.

10. In a rock drilling machine, the combination with a hollow rotatable shaft, of a skeleton spider head for said shaft having spider arms, and flat cross arms bolted to the outer ends of the spider arms and connected together to form a rigid frame.

11. In a rock drilling machine, the combination with a frame, of a track upon which said frame travels, a hollow rotatable shaft carried by said frame, drill supporting arms carried by the forward end of said shaft, spacing rollers projecting forward from said arms, and means tending normally to force said frame forward.

12. In a rock drilling machine, the combination with a frame, of a track upon which said frame travels, a hollow rotatable shaft carried by said frame, drill supporting arms carried by the forward end of said shaft, spacing rollers projecting forward from said arms, means tending normally to force said frame forward, and scrapers at the outer ends of said arms for removing the cuttings.

13. In a rock drilling machine, the combination with a rotatable head, of skeleton radiating arms secured thereto, and fluid operated drills having clasps adapted to engage said arms and support the drills at any point from the center to the outer ends.

14. In a rock drilling machine, the combination with a rotatable head, of skeleton radiating arms secured thereto, fluid operated drills having clamps adapted to engage said arms and support the drills at any point from the center to the outer ends, and means for supporting the drills at the outer ends of the arms at an angle.

15. In a rock drilling machine, the combination with a rotatable head, of skeleton arms secured thereto, fluid operated drills, and adjustable clamps on said drills adapted to engage said arms at any point and support the drills in adjusted position.

In testimony whereof I affix my signature in presence of two witnesses.

FRANKLIN M. ILER.

Witnesses:
R. P. RUSSELL,
M. O. HORNING.